Oct. 20, 1931.  A. BARÉNYI  1,828,215
PHOTOGRAPHIC SHUTTER
Filed Dec. 23, 1930   2 Sheets-Sheet 1
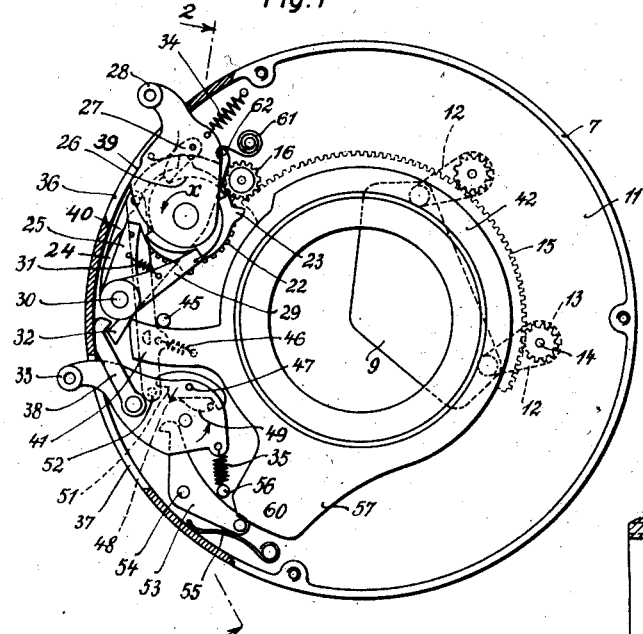
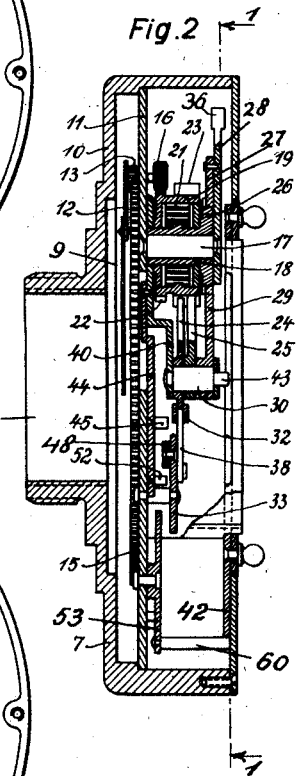
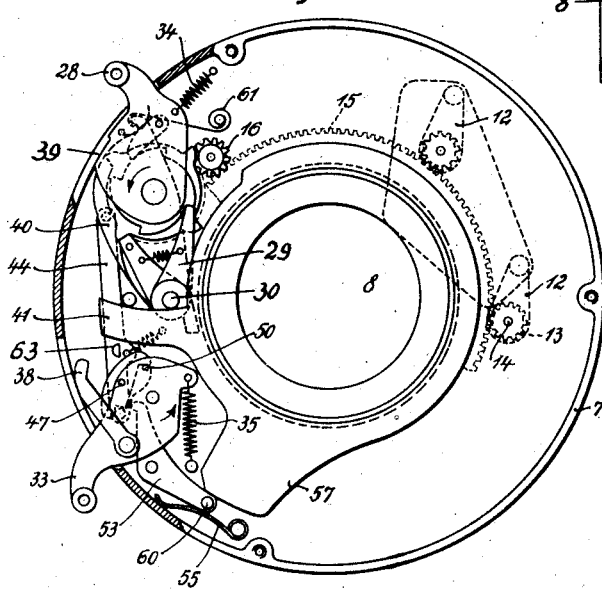
Inventor
Árpád Barényi
by Franz Reinhold
Attorney Inventor
Árpád Barényi
by Franz Reinhold
Attorney Patented Oct. 20, 1931

1,828,215

UNITED STATES PATENT OFFICE

ÁRPÁD BARÉNYI, OF BERLIN-LICHTERFELDE, GERMANY

PHOTOGRAPHIC SHUTTER

Application filed December 23, 1930, Serial No. 504,298, and in Germany January 9, 1930.

My invention relates to improvements in photographic shutters, and more particularly in the type of pivoted blade, symmetrical opening shutter comprising a blade mechanism and a spring driven motor or master member which when set and released rotates the blades in the same direction for opening and closing the shutter. The object of the improvements is to provide a shutter of this type by means of which time and bulb exposures can be made without setting the motor or master member. With this object in view my invention consists in mounting the pawl and latch controlling the releasing operation of the motor or master member on a device such as a rockable lever or plate adapted to be moved in a direction for opening the shutter and to be returned into initial position for closing the same, the said member being operated by the attendant for making bulb and time exposures.

Figure 4:
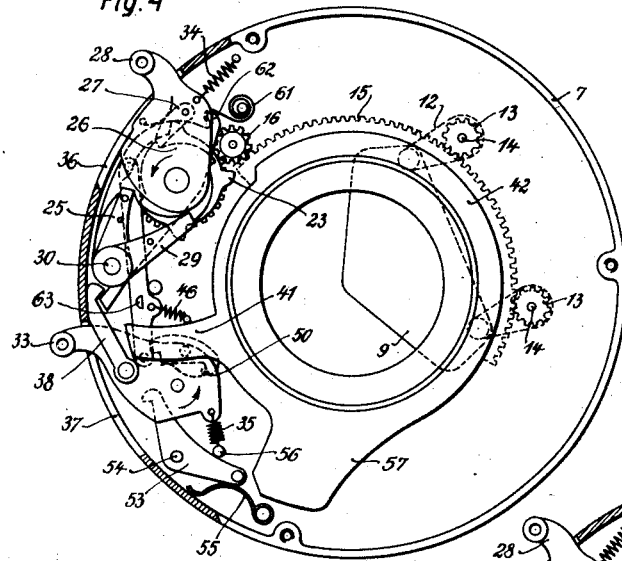
Figure 6:
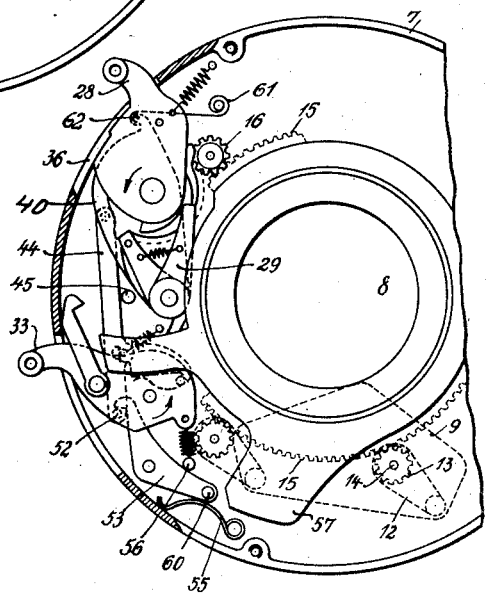
Figure 5:
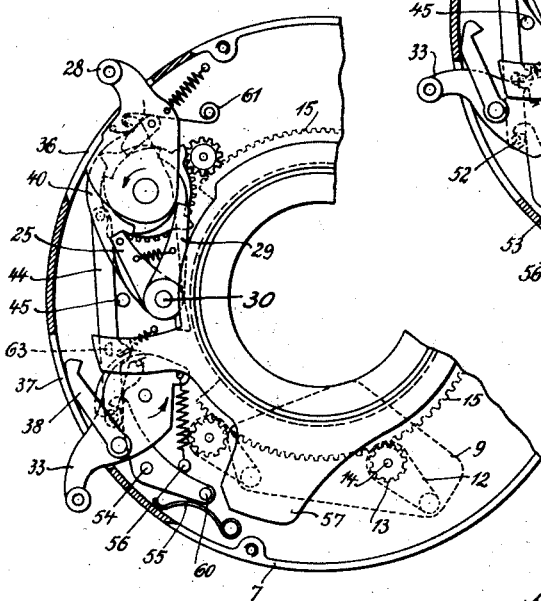

For the purpose of explaining the invention an example embodying the same has been shown in the accompanying drawings, in which the same letters of reference have been used in all the views to indicate corresponding parts. In said drawings, Fig. 1 is a sectional elevation taken on the line 1—1 of Fig. 2 and showing a shutter constructed in accordance with one embodiment of my invention, the parts being in the positions for making a bulb exposure, Fig. 2 is a sectional elevation taken on the line 2—2 of Fig. 1, Fig. 3 is a sectional elevation similar to the one shown in Fig. 1 and showing the shutter open and the parts in the position for making a bulb exposure, Fig. 4 is a similar sectional elevation showing the shutter closed and the mechanism in position for making a time exposure, Fig. 5 is a similar sectional elevation showing the shutter open and the mechanism in position for making a time exposure, and Fig. 6 is a similar sectional elevation showing the shutter open and the mechanism about to be released for closing the shutter.

As appears more particularly from Figs. 1 and 2, the shutter comprises the usual annular casing 7 having a central exposure or lens opening 8 normally closed by blades 9, the said blades being confined between the rear wall 10 of the casing and a partition member 11 upon which latter most of the shutter operating mechanism hereinafter described is carried. Each blade is supported on a pair of crank arms 12 connected with pinions 13 rotatable on pivot bolts 14 fixed to the partition member 11, and the said pinions are in mesh with a toothed ring 15 adapted to rotate the pinions and cranks through an angle of 360° for opening and closing the shutter. Fig. 1 shows only two pairs of crank arms 12 and a part of the toothed ring 15, the other pair of arms being omitted for clearness sake.

Rotary movement is imparted to the ring 15 through the intermediary of a pinion 16 from a motor or master member mounted on a stud 17 and comprising a tubular arbor 18 rotatably mounted on the said stud, a housing 19 rotatably mounted on said arbor, and a spiral spring 21 secured with its ends to said arbor and housing. The housing is formed with a toothed flange 22 meshing with the pinion 16 and with four lugs 23 cooperating with two pawls 24 and 25. The tubular arbor 18 is made integral with a flange 26 formed with four ratchet teeth normally engaged by a latch 29 and a spring-pressed pawl 27 mounted on a setting lever 28. The pawls 24, 25 and the latch 29 are mounted on a pivot bolt 30, and they are connected by a spring 31 tending to hold the same in engagement with the lugs 23 and the lugs formed on the flange 26. The pawls 24 and 25 are different in length, and normally only the pawl 25 is in locking engagement with one of the lugs 23 while the pawl 24 is idle, as is shown in Fig. 2. The pawl 24 is formed with a rear extension or heel 32 adapted to be engaged by a pawl 38 mounted on a spring-pressed operating lever 33 for rocking the same out of engagement with the lug 23. The setting lever 28 is formed with a cam face 39 adapted to engage the pawl 25 for rocking the same out of engagement with the lug 23.

The setting lever 28 and the operating lever 33 are acted upon by springs 34 and 35 respectively tending to return the same after operation into initial position, and they extend from the casing 7 outwardly and through slots 36 and 37 limiting their strokes.

If it is desired to make an instantaneous exposure the master member is first set by rocking the setting lever 28 in the direction of the arrow x, such rocking movement being transmitted by the pawl 27 to the flange 26 and the tubular arbor 18 for putting the spring 21 under tension. After the master member has thus been set the latch 29 engages the next lug of flange 26, and the housing of the master member tends to rotate in the direction of the arrow x.

Near the end of the rocking movement of the setting lever the cam face 39 engages the pawl 25 and rocks the same out of engagement with the lug 23 so that the housing 19 is slightly turned by its spring 21 in the direction of the arrow x, until it is arrested by the pawl 24 engaging the said lug. If now the lever 28 is returned by the spring 34 into initial position, the pawl 25 is pressed by the spring 31 on the bevelled outer face of the lug 23 so that it is in position for safely engaging the next lug 23. Now the pawl 24 is retracted from the lug 23 by means of the operating lever 33 and the pawl 38, and the housing 19 is released for imparting rotary movement to the pinion 16 and the toothed ring 15. By thus rotating the ring 15, the pinions 13 and crank arms 12 in one direction the shutter is opened and closed. Finally the housing is arrested by the pawl 25 engaging the next lug 23. When the levers 28 or 33 are released they are retracted into initial positions by the springs 34 and 35 acting thereon, and the pawl 38 pressed by its spring on the inner face of the circumferential wall of the casing 7 slightly rocks the heel 32 of the pawl 24 so that it engages at the rear of the said heel, as is shown in Fig. 1. The parts so far described do not form a part of any present invention.

Referring now to those parts to which my invention relates, the pivot bolt 30 carrying the pawls 24, 25 and 29 is mounted on a plate 40 rockingly mounted on the arbor 18. If it is desired to make an instantaneous exposure the plate 40 is locked in position by means of an arm 41 formed on a setting ring 42, the said ring being shifted from the position shown in Fig. 1 in clockwise direction and with the arm 41 engaging a projection 43 of the pivot bolt 30. If it is desired to make a bulb or time exposure the plate 40 is rocked in anticlockwise direction. For this purpose a link 44 jointed to the said plate extends with its free end into position for engagement by the operating lever 33, which link is normally guided on a pin 45 fixed to the member 11, a spring 46 being provided for holding the link in contact with the said pin. On a pivot bolt 47 fixed to the lever 33 a pawl 48 is rockingly mounted which is normally held by a spring 49 in engagement with a pin 50 fixed to the lever, and which is formed with a notch 51 adapted to engage a pin 52 secured to the end of the link 44. At the side of the lever 33 a hook-shaped latch 53 is rockingly mounted on a pivot bolt 54 secured to the partition member 11, and the said latch is acted upon by a spring 55 adapted to hold the same in engagement either with a pin 56 or with an arm 57 made integral with the ring 42. The hook-shaped end of the latch is adapted for locking engagement with the pin 52 fixed to the link 44. At its tail end the latch carries a pin 60 which is adapted to be engaged by the arm 57 formed on the setting ring 42.

If it is desired to make a bulb exposure, the master member is not set, the setting ring 42 is shifted into the position shown in Fig. 1 in which the arm 41 releases the projection 43 and the plate 40, and the arm 57 holds the latch 53 out of position for engagement with the pin 52 of the link 44, and the operating lever 33 is rocked in anticlockwise direction and into the position shown in Fig. 3, in which position the notch 51 of the pawl 48 engages the pin 52 and rocks the plate 40 in anticlockwise direction and into the position shown in Fig. 3. Thereby rotary movement is imparted to the master member and the toothed segment 22 thereof, the said rotary movement being sufficient to open the blades. When the lever 33 is released the spring 35 returns the same into initial position, and a spring 61 attached to a hook 62 of the plate 40 returns the master member into initial position so that the blades are closed.

If it is desired to make a time exposure, by the first operation of the operating lever 33 the shutter blades are opened and by a second operation thereof the blades are closed. The setting ring 42 is shifted from the position shown in Figs. 1 and 3 into the position shown in Figs. 4 to 6, so that its arm 57 releases the latch 53 which is therefore rocked by the spring 55 with its hook-shaped end outwardly and into position for locking engagement with the pin 52, the said latch now bearing with its tail end on the pin 56. If now the lever 33 is rocked in the manner just described, the master member is again bodily rocked into position for opening the blades, and at the end of the said rocking movement the latch 53 engages the pin 52 so as to lock the link 44 and the plate 40 in position, as is shown in Fig. 5. If now the lever 33 is released it is rocked by the spring 35 into initial position, but the link 44 and the plate 40 are prevented by the latch 53 from returning into initial position and closing the shutter. Now the parts (except lever 33) are in the position shown in Fig. 5. As the lever 33 is rocked into initial position the pawl 48 rides on a lug 63 secured to the link 44, and it yields relatively to said lug by reason of the spring 49. At the end of the return movement of the lever 33 the front end of the pawl 18 is in position for engagement with the lug 63, and if the lever 33 is again operated the pawl 48 presses on the said lugs 63 and rocks the link 44 out of engagement with the latch 53. Therefore the master member is returned by the spring 61 into initial position for closing the shutter blades.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a photographic shutter, the combination, with the shutter blades, the operating mechanism therefor comprising a master member, means for controlling the said master member for instantaneously opening and closing the shutter blades, and means for bodily moving said master member in a direction for opening the shutter blades and returning the same into initial position for closing said shutter blades.

2. In a photographic shutter, the combination, with the shutter blades rotatable in one direction for opening and closing the shutter, the operating mechanism therefor comprising a master member, pawls controlling the operation thereof, and operating means for said pawls, of a member on which said pawls are mounted shiftable in a direction for bodily moving said master member in a direction for opening the shutter blades, and means for shifting said shiftable member and returning the same into initial position.

3. In a photographic shutter, the combination, with the shutter blades rotatable in one direction for opening and closing the shutter, operating mechanism therefor comprising a master member, pawls controlling the operation thereof, and operating means for said pawls, of a member on which said pawls are mounted shiftable in a direction for bodily moving said master member in a direction for opening the shutter blades, means for shifting said shiftable member, and hand controlled means for returning said shiftable member into initial position.

4. In a photographic shutter, the combination, with the shutter blades rotatable in one direction for opening and closing the shutter, operating mechanism therefor comprising a master member, pawls controlling the operation of said master member, and operating means for said pawls, of a member on which said pawls are mounted shiftable in a direction for bodily moving said master member in a direction for opening the shutter blades, means for shifting said shiftable member and returning the same into initial position, and releasable means for fixing said shiftable member in non-shifted position.

5. In a photographic shutter, the combination, with the shutter blades rotatable in one direction for opening and closing the shutter, the operating mechanism thereof comprising a master member, pawls controlling the operation thereof, and operating means for said pawls, of a member on which said pawls are mounted rockable concentrically of said master member in a direction for bodily moving said master member in a direction for opening the shutter blades, an operating member connected with said rockable member for rocking the same in a direction for opening the shutter blades, and automatic means operative when said operating member is released for returning the master member into initial position.

6. In a photographic shutter, the combination, with the shutter blades rotatable in one direction for opening and closing the shutter, operating mechanism therefor comprising a master member, pawls controlling the operation thereof, and operating means for said pawls, of a member on which said pawls are mounted rockable concentrically of said master member in a direction for bodily moving said master member in a direction for opening the shutter blades, a link connected with said rockable member, an operating member yieldingly connected with said link for rocking said rockable member in a direction for opening the shutter blades, and automatic means operative when said operating member is released for returning said master member into initial position.

7. In a photographic shutter, the combination, with the shutter blades rotatable in one direction for opening and closing the shutter, the operating mechanism thereof comprising a master member, pawls controlling the operation thereof, and operating means for said pawls, of a member on which said pawls are mounted rockable concentrically of said master member in a direction for bodily moving said master member in a direction for opening the shutter blades, a link connected with said rockable member, an operating member yieldingly connected with said link for rocking said rockable member in a direction for opening the shutter blades, automatic means operative when said operating member is released for returning said master member into initial position, means for locking said rockable member in rocked position, and means on said operating member operative when operating the same a second time for disconnecting said rockable member from said locking means.

8. In a photographic shutter, the combination, with the shutter blades rotatable in one direction for opening and closing the shutter, the operating mechanism thereof comprising a master member, pawls controlling the operation thereof, and operating means for said pawls, of a member on which said pawls are mounted rockable concentrically of said master member in a direction for bodily moving said master member in a direction for opening the shutter blades, a rockable operating lever, a spring-pressed pawl mounted on said lever and adapted when operating said lever to act on said rockable member for rocking the same in a direction for opening said shutter blades, means for locking said rockable member in rocked position, automatic means for returning said operating member into initial position, said pawl being adapted to yield relatively to said rockable member when said lever returns into initial position, and means connected with said rockable member and located in position when said rockable member is in rocked position for being engaged by said pawl and adapted when operating said operating member a second time to disconnect said rockable member from said operating member.

9. In a photographic shutter, the combination, with the shutter blades rotatable in one direction for opening and closing the shutter, the operating mechanism thereof comprising a master member, pawls controlling the operation thereof, and operating means for said pawls, of a member on which said pawls are mounted rockable concentrically of said master member in a direction for bodily moving said master member in a direction for opening the shutter blades, a link jointed to said rockable member, a rockable operating lever cooperating with said link, a spring-pressed pawl mounted on said lever and adapted when operating said lever to act on said link for rocking said rockable member in a direction for opening said shutter blades, means for locking said rockable member in rocked position, automatic means for returning said operating member into initial position, said pawl being adapted to yield relatively to said link when said lever returns into initial position, and means connected with said link and located in position when said rockable member is in rocked position for being engaged by said pawl and adapted when operating said operating member a second time to disconnect said operating member from said link.

10. In a photographic shutter, the combination, with the shutter blades rotatable in one direction for opening and closing the shutter, the operating mechanism thereof comprising a master member, pawls controlling the operation thereof, and operating means for said pawls, of a member on which said pawls are mounted rockable concentrically of said master member in a direction for bodily moving said master member in a direction for opening the shutter blades, a link connected with said rockable member, an operating member yieldingly connected with said link for rocking said rockable member in a direction for opening the shutter blades, automatic means operative when said operating member is released for returning said master member into initial position, means for locking said rockable member in rocked position, means for throwing said locking means out of operation, and means on said operating member operative when operating the same a second time for disconnecting said rockable member from said locking means.

11. In a photographic shutter, the combination, with the shutter blades rotatable in one direction for opening and closing the shutter, the operating mechanism thereof comprising a master member, pawls controlling the operation thereof, and operating means for said pawls, of a member on which said pawls are mounted rockable concentrically of said master member in a direction for bodily moving said master member in a direction for opening the shutter blades, a link jointed to said rockable member, a rockable operating lever cooperating with said link, a spring-pressed pawl mounted on said lever and adapted when operating said lever to act on said link for rocking said rockable member in a direction for opening said shutter blades, a spring-pressed pawl adapted to engage said link for locking said rockable member in rocked position, means for setting said pawl in inoperative position, automatic means for returning said operating member into initial position, said pawl being adapted to yield relatively to said link when said lever returns into initial position, and means connected with said link and located in position when said rockable member is in rocked position for being engaged by said pawl and adapted when operating said operating member a second time to disconnect said operating member from said link.

In testimony whereof I hereunto affix my signature.

ÁRPÁD BARÉNYI.